Figure 1:
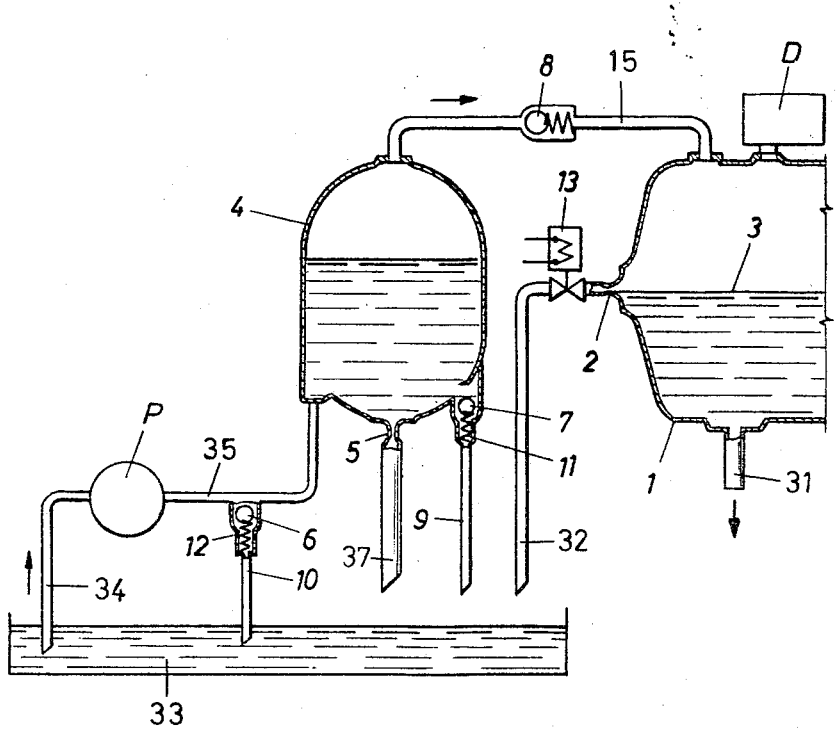

United States Patent Office 3,297,236
Patented Jan. 10, 1967

3,297,236
APPARATUS FOR REPLENISHING THE AIR CUSHION IN THE SURGE TANK OF A HYDRAULIC SYSTEM
Otto Eckerle, 3 Am Bergwald, Malsch, Germany, and Helmut Weinzierl and Ernst Putschky, both of 5 Liszstrasse, Rastatt, Germany
Filed Mar. 2, 1964, Ser. No. 348,665
17 Claims. (Cl. 230—17)

This invention relates to hydraulically operated devices, and more particularly to an apparatus for controlling and replenishing the air cushion in the surge tank of a hydraulic system.

It is conventional to provide replenishment for the air cushion in a surge or expansion tank in hydraulic devices because some of the cushioning air is unavoidably lost during operation through leaks and by dissolution and entrainment in the operating fluid. It is known to employ a pump for feeding replenishing air to the surge or expansion tank, and the pump may be controlled by a pressure sensitive switch in the surge tank.

The invention is more specifically concerned with the problem of replenishing surge tanks with cushioning air at pressures higher than those available from a piston pump and requiring the use of gear pumps or similar pumps in which the discharge conduit of the pump is fully sealed from the intake conduit under all conditions, even when the pump stands still.

An object of the invention is the pumping of a fixed amount of air into the surge tank when the pressure drop in the latter actuates the pressure sensitive switch. Another object is the provision of simple and reliable means for removing excess air from the surge tank.

A further object is the provision of a replenishing system which is relieved of internal pressure whenever the pump does not operate, yet prevents loss of air from the surge tank itself during periods of idleness.

Yet another object is the provision of a compact control unit which may be mounted on or remote from a surge tank, and which provides replenishment for the air cushion in the tank when connected to the tank and to a supply of hydraulic liquid by simple pipe connections.

With these and other objects in view, the invention in its more specific aspects provides a connecting conduit which connects the air cushion in the top portion of the surge tank to the top portion of an auxiliary tank. A check valve in the connecting conduit passes air from the auxiliary tank to the surge tank only. The two tanks are each provided with a vent for bleeding fluid from the tanks. The vent for the surge tank communicates with a portion of the tank intermediate the top and bottom portions. An electrically operated pump is arranged to pump liquid from a source thereof into the auxiliary tank. The pump is controlled by a pressure sensitive switch operatively connected to the surge tank for operating the pump when the tank pressure is below a predetermined minimum limit. At least one pressure responsive valve communicates with the ambient atmosphere and with the bottom of the auxiliary tank, and disconnects the tank bottom from the atmosphere when the pressure in the tank rises substantially beyond atmospheric pressure.

Figure 2:
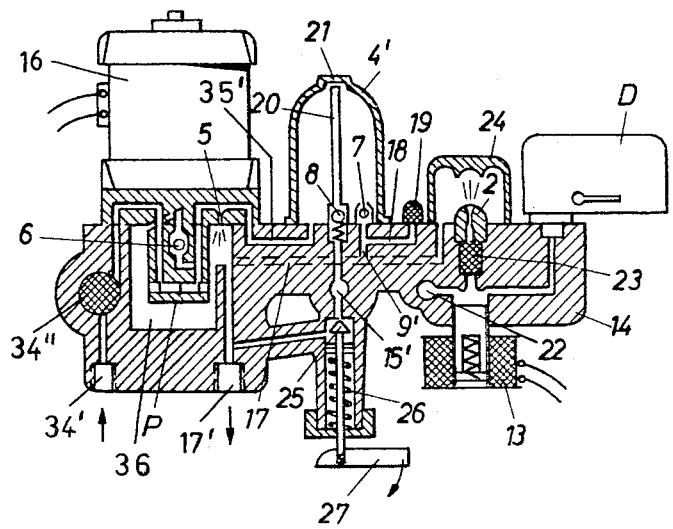

Other features and many of the attendant advantages of this invention will be readily appreciated as the same becomes better understood by reference to the following detailed description when considered in connection with the accompanying drawings wherein:

FIG. 1 illustrates a surge tank equipped with the replenishing apparatus of the invention in a diagrammatic elevational view; and FIG. 2 shows a control unit of the invention in elevational section.

Referring now to the drawing in detail, and initially to FIG. 1, there is shown a surge tank 1 the bottom of which is connected to associated hydraulic equipment, not shown, by a pipe 31. A narrow vent nozzle 2 in a side wall of the tank 1 determines the level 3 of the hydraulic liquid in the tank 1 when a drain pipe 32 is connected to the vent 2 by a normally closed solenoid valve 13. The discharge orifice of the pipe 32 is located above the liquid level in a sump tank 33.

A pressure-sensitive switch D mounted on the top of the tank 1 closes an electric circuit when the pressure of the air cushion above the level 3 in the tank 1 drops below a minimum value, and opens the circuit at a predetermined maximum pressure value. The switch D controls the motor of a gear pump P. The intake pipe 34 of the pump dips into the liquid in the sump tank 33.

The discharge pipe 35 of the pump P terminates at the bottom of an auxiliary tank 4 shown in FIG. 1 to be partly filled with liquid. The top of the tank 4 is connected to the top of the much larger surge tank 1 by a pipe 15 in which a spring loaded ball check valve 8 is provided. The valve 8 is arranged to open when fluid flows from the auxiliary tank 4 toward the surge tank 1.

A return pipe 10 branches from the discharge pipe 35 and terminates below the liquid level in the sump tank 33. It is equipped with a check valve including a spherical valve body 6 and a spring 12 dimensioned to open the valve when the pressure in the pipe 35 drops to a value slightly above atmospheric pressure, and to prevent flow of liquid from the pipe 35 to the sump tank at higher pressure.

A narrow vent nozzle 5 at the bottom of the auxiliary tank 4 continuously drains liquid from the bottom of the tank through a pipe 37 to the sump tank 33. Another pipe 9 is arranged at the bottom of the auxiliary tank 4, but above the orifice of the vent 5. It is blocked by a spherical check valve member 7 as long as the pressure in the tank 4 is sufficient to overcome the force of the valve spring 11. The spring 11 is dimensioned to open the pipe 9 when the liquid pressure on the valve member 7 approaches atmospheric pressure. The discharge end of the pipe 9 is open to the atmosphere.

The apparatus will be understood further to comprise a source of current for operation of the pump P and of the solenoid valve 13, and a common main switch interposed between this source, the pump, and the valve 13 in such a manner that the valve is energized, and thereby opened, whenever the main switch is closed, whereas actual operation of the pump P is controlled by the serially arranged pressure-sensitive switch D. The electrical circuits are entirely conventional, and have not been shown in FIG. 1.

The afore-described device operates as follows when the non-illustrated main switch is closed:

Assuming that the liquid level 3 initially is above the vent 2 and that the pressure of the air cushion above the liquid in the tank 1 initially is higher than the maximum pressure setting of the switch D, liquid is discharged through the drain pipe 32 to the sump tank 33 until the liquid level shown in FIG. 1 is reached. Air is then vented to the atmosphere until the minimum pressure set on the switch D is reached.

The pump P is thereby actuated, and forces liquid from the sump tank 33 into the initially empty auxiliary tank 4 at a rate greater than the rate of liquid return to the sump tank through the open pipes 10, 37, and 9. As a body of liquid collects in the tank 4, the check valve 6 closes first, and the check valve 7 closes shortly thereafter. Air is thereby compressed in the tank 4 by the pumped liquid until the check valve 8 opens, and air can flow into the surge tank 1 through the connecting pipe 15.

The maximum pressure setting of the switch D is selected in such a manner that the maximum pressure is reached in the tank 1 before all the air originally present in the auxiliary tank 4 is transferred to the surge tank 1. The pump P is thereby stopped, and the check valve 8 closes as the pressures in the tanks 1, 4 are equalized.

Liquid gradually drains from the auxiliary tank 4 through the vent 5 until the pressure of air above the liquid is reduced to a negative value almost sufficient to balance the hydrostatic pressure above the check valve 7. The valve is opened by the spring 11, a small amount of liquid is discharged, and air is thereafter drawn into the pipe 9 while the check valve 6 remains closed. Ultimately, the pressure within the auxiliary tank 4 becomes low enough to permit the valve 6 to be opened by the spring 12, and the remaining liquid is drained from the auxiliary tank. The tank 4 is now filled with air at atmospheric pressure, and the apparatus is ready for the next cycle of operations.

The reliability of the apparatus illustrated depends on proper functioning of the check valves 6 and 7. The time required for completely filling the tank 4 with air at atmospheric pressure is increased when either check valve sticks, or when its effective flow section is reduced by foreign bodies. Any impurities present are washed away by the outward flow of liquid through the valves during each operating cycle.

The solenoid valve 13 prevents unnecessary bleeding of air from the surge tank 1 when the apparatus is not operated. The afore-mentioned common main switch of the pump P and of the solenoid valve 13 may be coupled to electrical controls of the non-illustrated hydraulic apparatus in such a manner as to energize the solenoid 13 only when the surge tank is operated. The solenoid valve also prevents unnecessary loss of compressed air in the event of current failure.

FIG. 2 shows an embodiment of the invention in which all working elements of the apparatus shown in FIG. 1 other than the tanks 1, 4, and 33 are mounted on or in a common support. The control unit shown in FIG. 2 may be connected to tanks and to an electrical switchboard in a manner evident from the preceding description of the apparatus illustrated in FIG. 1.

A supporting casing 14 carries the electric motor 16 of the gear pump P. The intake duct 34' of the pump terminates in a threaded connection on the casing 14 and includes an oil filter 34''. Respective portions of the duct 34' are constituted by bores in the body of the pump and in the casing 14. A similar discharge duct 35' leads from the pump P to an orifice in a flat surface portion of the casing 14. The check valve 6 and the vent 5 connect the discharge duct 35' with a chamber 36 in the casing 14. An overflow or return duct 17' terminates in a threaded connector on the casing 14 for connection to a pipe which terminates above the sump tank 33 in the manner of the pipe 37 in FIG. 1.

The afore-mentioned flat surface portion of the casing 14 is covered by a bell 4' which constitutes the auxiliary tank of the apparatus. The bell is held in sealing engagement with the casing surface by a releasable, bayonet-type fastening arrangement conventional in itself, and not shown in the drawing. The casing portion covered by the bell 4' also carries the check valves 7, 8 which are thus readily accessible for maintenance and repair by removal of the bell.

A feed pipe 20 attached to the valve 8 has a free orifice near the top 21 of the bell 4'. A connecting duct 15' leads from the valve 8 to a threaded connector, not visible in FIG. 2, from which a pipe may lead to the top of the surge tank. A pressure relief valve 25 communicates with the duct 15' and is normally held closed by a spring 26. When the pressure in the surge tank should exceed a desirable limit, the valve 25 is opened, and air is released to the atmosphere through the duct 17'. The surge tank may also be manually relieved of internal pressure. The valve 25 can be opened by a handle 27 against the restraint of the spring 26.

The valve 7 communicates with the atmosphere through a duct 18 and an air filter 19. It also communicates with the return duct 17' through a duct 9' and a bore 17 in the casing 14. The bore 17 has an orifice in the surface of the casing 14 under a transparent cover 24. The vent nozzle 2 is mounted under the cover 24 and is protected against clogging by a filter 23. The filter communicates with a vent duct 22 in the casing 14 through the solenoid valve 13. The duct 22 terminates in a non-illustrated threaded connector on the casing 14 for connection to the surge tank at a desired liquid level. The pressure sensitive switch D communicates with the vent duct 22.

The unit illustrated in FIG. 2 operates in the manner described hereinabove with respect to FIG. 1 when pipe connections are established between the intake duct 34' and a portion of a sump tank below the liquid level therein, between the overflow duct 17' and the air space above the sump duct, between the duct 15' and the top of the surge tank, and between the duct 9' and a portion of the surge tank between top and bottom.

The transparent cover 24 permits the operation of the vent nozzle 2 to be inspected from time to time without interrupting operation. The cover is removable in the manner described more fully with respect to the bell 4', and thus gives access to the nozzle 2 and the filter 23 for servicing.

Spring loaded check valves 6 and 7 are preferred in the apparatus illustrated in FIG. 1 and in the control unit shown in FIG. 2 because of their simplicity. The valves close substantially in synchronization with the operation of the pump P, and open shortly after the pump is stopped. Their opening and closing may be coordinated with the operation of the pump in any other desired manner. They may thus be replaced by normally open solenoid valves in circuit with the switch D and the pump P in such a manner that they are closed when the pump is energized. Conversely, their place may be taken by normally closed solenoid pumps arranged in circuit with a normally closed pressure sensitive switch arranged closely adjacent the output end of the pump. As soon as the pump starts operating, the switch deenergizes and thereby closes the solenoid valves.

The location of the vent nozzle 5 is not critical. The apparatus shown in FIG. 1 and the control unit illustrated in FIG. 2 operate in the manner described as long as the vent nozzle 5 is arranged anywhere in the continuous fluid path between the output end of the pump P and the check valve 8. It need not necessarily have the illustrated convergent-divergent shape, but may be a transversely elongated slot, a duct of cylindrical shape, and the like. It is evident from inspection of FIGS. 1 and 2, that the nozzle 2 may actually be replaced by a notch in the casing of the valve 6 which provides a permanent narrow bypass. However, the shape specifically illustrated is preferred because it is least subject to clogging by impurities in the hydraulic liquid.

Many arrangements for preventing air loss during non-operative periods other than the solenoid valve 13 will readily suggest themselves to those skilled in the art. Suitable substitutes include a float valve which is closed when the liquid level in the tank 1 drops below a predetermined minimum, and a solenoid valve controlled through a pressure actuated switch at the discharge end of the pump P as described hereinabove with reference to a modification of the valves 6 and 7.

It will be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. An apparatus for replenishing the air cushion in a surge tank comprising, in combination:
    (a) an auxiliary tank;
    (b) means for supplying air to said tank and for compressing the supplied air;
    (c) a connecting conduit communicating with said auxiliary tank and adapted to be connected with said surge tank;
    (d) check valve means in said connecting conduit;
    (e) first vent means for continuously releasing a small amount of fluid from said auxiliary tank; and
    (f) second vent means adapted to be connected to said surge tank for continuously releasing a small amount of fluid from said surge tank.

2. An apparatus as set forth in claim 1, further comprising a duct communicating with said first and second vent means for jointly receiving the release fluids.

3. An apparatus as set forth in claim 2, further comprising a return pipe communicating with said auxiliary tank, and valve means responsive to a pressure greater than atmospheric pressure in said auxiliary tank to close said return pipe.

4. A control unit for replenishing the air cushion in a surge tank comprising, in combination:
    (a) a support;
    (b) an auxiliary tank mounted on said support;
    (c) means for supplying air to said tank and for compressing the supplied air;
    (d) a connecting conduit on said support, said conduit communicating with said auxiliary tank and being adapted to be connected with said surge tank;
    (e) check valve means in said connecting conduit;
    (f) first vent means on said support, said vent means communicating with said auxiliary tank for continuously releasing a small amount of fluid therefrom; and
    (g) second vent means mounted on said support, said vent means being adapted to be connected to said surge tank for continuously releasing a small amount of fluid from said surge tank.

5. A unit as set forth in claim 4, further comprising a duct fixedly secured to said support, said duct communicating with said first and second vent means for receiving the released fluids.

6. A unit as set forth in claim 5, further comprising a pipe communicating with said auxiliary tank, and pressure responsive valve means responsive to a pressure greater than atmospheric pressure in said auxiliary tank to close said pipe.

7. A unit as set forth in claim 5, wherein said means for supplying and compressing air include a pump and an electric motor mounted on said support, said motor being in driving engagement with said pump, pressure sensitive switch means mounted on said support in circuit with said motor, and a conduit for connecting said switch means to said surge tank.

8. A unit as set forth in claim 7, further comprising electrically operated valve means mounted on said support and arranged in circuit with said motor for closing said second vent means when said motor is deenergized.

9. A unit as set forth in claim 6, wherein said second vent means is arranged on an outer surface of said support, and a transparent cover releasably covering said second vent means.

10. A unit as set forth in claim 6, wherein said auxiliary tank constitutes bell means releasably covering a surface portion of said support, said check valve means and said pressure responsive valve means being mounted on said surface portion.

11. A unit as set forth in claim 10, further comprising a feed pipe extending in said auxiliary tank from said check valve means in a normally upward direction away from said surface portion.

12. A unit as set forth in claim 5, further comprising a pressure relief valve mounted on said support, said connecting conduit communicating with said pressure relief valve.

13. A unit as set forth in claim 4, further comprising filter means associated with one of said vent means for filtering the fluid to be released by the associated vent means.

14. An apparatus for replenishing the air cushion in a hydraulic system comprising, in combination:
    (a) a surge tank;
    (b) a first connecting conduit communicating with a bottom portion of said tank;
    (c) an auxiliary tank;
    (d) a second connecting conduit connecting the top portion of said surge tank to a top portion of said auxiliary tank;
    (e) a check valve in said second connecting tank for selectively passing fluid from said auxiliary tank to said surge tank;
    (f) a supply of liquid;
    (g) electrically operated pump means communicating with said supply and with said auxiliary tank for pumping liquid to said auxiliary tank;
    (h) pressure sensitive switch means operatively connected to said surge tank for operating said pump means when the pressure in said surge tank is below a predetermined limit;
    (i) first vent means communicating with said auxiliary tank for continuously bleeding fluid from said auxiliary tank;
    (j) second vent means on said surge tank for continuously bleeding fluid from said surge tank, said second vent means communicating with a portion of said surge tank intermediate said top and bottom portions thereof; and
    (k) normally open pressure responsive valve means communicating with the bottom portion of said auxiliary tank and with the atmosphere, and responsive to a pressure in said auxiliary tank substantially greater than atmospheric pressure for disconnecting said bottom portion from the atmosphere.

15. An apparatus as set forth in claim 14, further comprising a return conduit communicating with the bottom of said auxiliary tank and with said source of liquid, and downwardly extending from said bottom to said tank, and additional pressure responsive valve means in said return conduit for disconnecting said bottom portion from said source of liquid when the pressure in said bottom portion is substantially greater than atmospheric pressure, said additional valve means being normally open.

16. An apparatus as set forth in claim 15, further comprising an electrically actuated normally closed valve in circuit with said pump means and connected to said second vent means for opening the same when said pump means are operated, and for closing said second vent means when said pump is inoperative.

17. An apparatus as set forth in claim 14, wherein the normally open pressure responsive valve means are electrically operated.

References Cited by the Examiner
UNITED STATES PATENTS

| | | | |
|---|---|---|---|
| 1,552,088 | 9/1925 | Smith | 103—6 |
| 1,625,892 | 4/1927 | Hollander | 103—6 |
| 1,760,849 | 5/1930 | Pomeroy | 103—9 |

LAURENCE V. EFNER, *Primary Examiner.*